United States Patent
Durham et al.

(10) Patent No.: US 12,479,829 B2
(45) Date of Patent: Nov. 25, 2025

(54) 2-[2-METHYLAZETIDIN-1-YL]-4-PHENYL-6-(TRIFLUOROMETHYL)-PYRIMIDINE COMPOUNDS

(71) Applicant: Eli Lilly and Company, Indianapolis, IN (US)

(72) Inventors: Timothy Barrett Durham, Indianapolis, IN (US); Junliang Hao, Carmel, IN (US); Richard Duane Johnston, Greenfield, IN (US)

(73) Assignee: Eli Lilly and Company, Indianapolis, IN (US)

( * ) Notice: Subject to any disclaimer, the term of this patent is extended or adjusted under 35 U.S.C. 154(b) by 660 days.

(21) Appl. No.: 17/799,026

(22) PCT Filed: Feb. 5, 2021

(86) PCT No.: PCT/US2021/016742
§ 371 (c)(1),
(2) Date: Aug. 11, 2022

(87) PCT Pub. No.: WO2021/162943
PCT Pub. Date: Aug. 19, 2021

(65) Prior Publication Data
US 2023/0167087 A1    Jun. 1, 2023

Related U.S. Application Data

(60) Provisional application No. 62/975,856, filed on Feb. 13, 2020.

(51) Int. Cl.
*C07D 403/04* (2006.01)
*A61K 31/506* (2006.01)
*A61P 3/10* (2006.01)
*A61P 9/00* (2006.01)
*A61P 13/12* (2006.01)
*C07D 403/14* (2006.01)

(52) U.S. Cl.
CPC ......... *C07D 403/04* (2013.01); *C07D 403/14* (2013.01)

(58) Field of Classification Search
CPC .. C07D 403/04; C07D 403/14; A61K 31/506; A61P 3/10; A61P 9/00; A61P 13/12
See application file for complete search history.

(56) References Cited

PUBLICATIONS

Hannou, S.A., et al., *Fructose Metabolism and Metabolic Disease*, J. Clin. Invest. 128(2), pp. 544-555 (2018).
Ishimoto, T., et al., *Opposing Effects of Fructokinase C and A Isoforms on Fructose-Induced Metabolic Syndrome in Mice*, Proc. Natl. Acad. Sci. USA, 109(11), pp. 4320-4325 (2012).
Softic, et al., *Divergent Effects of Glucose and Fructose on Hepatic Lipogenesis and Insulin Signaling*, J. Clin. Invest., 127(11), pp. 4059-4074 (2017).
Cirillo, P., et al., *Ketohexokinase-Dependent Metabolism of Fructose Induces Proinflammatory Mediators in Proximal Tubular Cells*, J. Am. Soc. Nephrol., 20, 545-553, 2009.
Vos, M.B., et al., *Dietary Fructose in Nonalcoholic Fatty Liver Disease*, Hepatology, 57, pp. 2525-2531 (2013).
Bastin, R.J., et al., *Salt Selection and Optimisation Procedures for Pharmaceutical New Chemical Entities*, Org. Process. Res. Dev., 4, pp. 427-435 (2000).
Berge, S.M., et al., *Pharmaceutical Salts*, J. Pharm. Sci., 66, pp. 1-19 (1977).
Mirtschink, P., et al., *Fructose Metabolism, Cardiometabolic Risk, and the Epidemic of Coronary Artery Disease*, Eur. Heart J., 39, pp. 2497-2505 (2018).

*Primary Examiner* — Brenda L Coleman
(74) *Attorney, Agent, or Firm* — Nielsen IP Law LLC

(57) ABSTRACT

The present invention provides a compound of Formula (I), or a pharmaceutically acceptable salt thereof, and the use of compounds of Formula (I) for treating metabolic conditions, such as type 2 diabetes mellitus, heart failure, diabetic kidney disease, and non-alcoholic steatohepatitis.

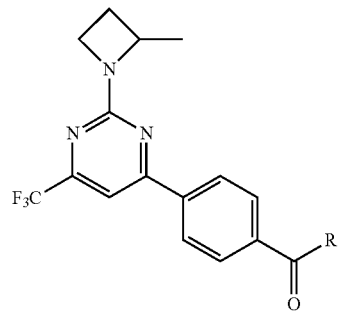

9 Claims, No Drawings

2-[2-METHYLAZETIDIN-1-YL]-4-PHENYL-6-(TRIFLUOROMETHYL)-PYRIMIDINE COMPOUNDS

The present invention relates to novel ketohexokinase (KHK) inhibitor compounds, to pharmaceutical compositions comprising the compounds and to the use of the compounds for the treatment of certain conditions, such as type 2 diabetes mellitus (T2DM), heart failure, diabetic kidney disease and non-alcoholic steatohepatitis (NASH).

KHK, also referred to as fructokinase, is the rate-limiting enzyme involved in fructose metabolism. It catalyses the phosphorylation of fructose to fructose-1-phosphate (F1P), causing concomitant depletion of cellular ATP levels. In contrast to glucose, fructose metabolism lacks feedback inhibition and it triggers accumulation of downstream intermediates involved in, for example, lipogenesis, gluconeogenesis and oxidative phosphorylation (Hannou, S. A., et al.; *J. Clin. Invest.*, 128(2), 544-555, 2018). This has negative metabolic consequences which are associated with a number of serious metabolic disorders.

KHK exists in two alternatively spliced isoforms consisting of KHK-C and KHK-A differing in exon 3. KHK-C is expressed primarily in the liver, kidney and intestine, whereas KHK-A is more ubiquitous. Mice deficient in both isoforms are fully protected from fructose-induced metabolic syndrome. However, the adverse metabolic effects are exacerbated in mice lacking KHK-A only (Ishimoto T, et al.; *Proc. Natl. Acad. Sci. USA*, 109(11), 4320-4325, 2012).

Several epidemiologic and experimental studies have reported that increased consumption of fructose, and more precisely increased fructose metabolism, may play an important role in the development of certain disorders, including metabolic syndrome and in particular, in the development of T2DM (Softic et al.; *J. Clin. Invest.*, 127 (11), 4059-4074, 2017), heart failure (Mirtschink, P., et al.; *Eur. Heart J.*, 39, 2497-2505, 2018), diabetic kidney disease (Cirillo, P., et al.; *J. Am. Soc. Nephrol.*, 20, 545-553, 2009) and NAFLD/NASH (Vos, M. B., et al.; *Hepatology*, 57, 2525-2531, 2013). Targeting inhibition of KHK is expected to limit fructose metabolism and provide effective treatment options for a number of metabolic disorders.

US 2017/0183328 A1 discloses substituted 3-azabicyclo[3.1.0]hexanes as KHK inhibitors. Recently published data shows that ketohexokinase inhibitor PF-06835919 administered for 6 weeks reduces whole liver fat as measured by magnetic resonance imaging-proton density fat fraction in subjects with non-alcoholic fatty liver disease (*J. Hepatology*. EASL International Liver Congress Abstracts, Supplement N°1S Vol. 70, April 2019).

There is a need for alternate treatments for metabolic syndrome and associated indications including T2DM, heart failure, diabetic kidney disease and NASH. In particular, there is a need for compounds which are potent inhibitors of KHK. There is a need for KHK inhibitor compounds having advantageous properties, for example, good oral bioavailabilty to support daily dosing.

Accordingly, in one embodiment, the present invention provides a compound of Formula I:

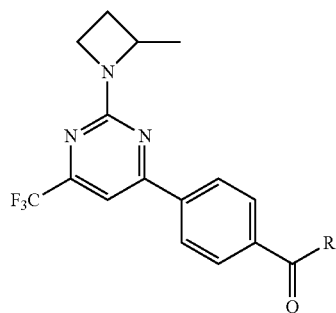

Formula I wherein
R is —OH, —NHC(CH$_2$OH)$_3$ or

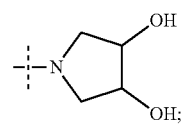

or a pharmaceutically acceptable salt thereof.
In a particular embodiment, when R is

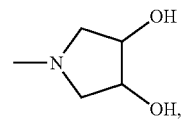

the —OH groups are in the cis configuration relative to each other.

In a particular embodiment, the compound is of Formula Ia:

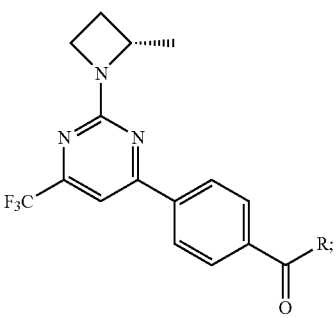

Formula Ia or a pharmaceutically acceptable salt thereof.

In an embodiment, the compound of Formula I is:

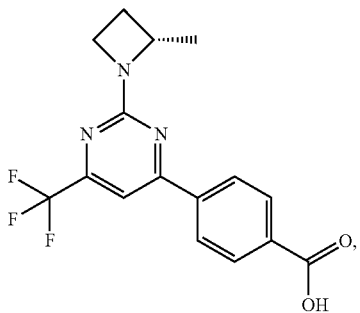 [SMILES: C[C@H]1CCN1c1nc(-c2ccc(C(=O)O)cc2)cc(C(F)(F)F)n1]

or a pharmaceutically acceptable salt thereof.

In an embodiment, the compound of Formula I is:

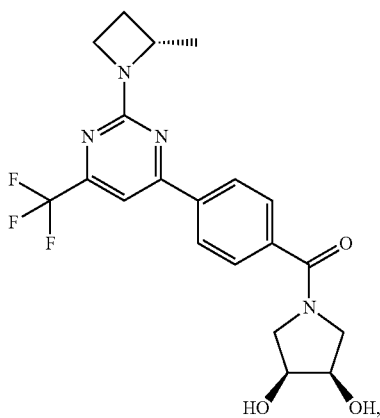 [SMILES: C[C@H]1CCN1c1nc(-c2ccc(C(=O)N3C[C@@H](O)[C@@H](O)C3)cc2)cc(C(F)(F)F)n1]

or a pharmaceutically acceptable salt thereof.

In an embodiment, the compound of Formula I is:

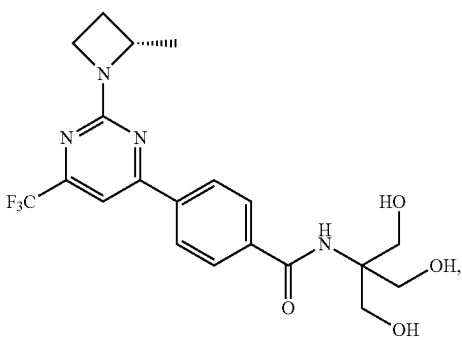 [SMILES: C[C@H]1CCN1c1nc(-c2ccc(C(=O)NC(CO)(CO)CO)cc2)cc(C(F)(F)F)n1]

or a pharmaceutically acceptable salt thereof.

Formula I encompasses Formulae Ia and Ib and reference to Formula I below, for example in the methods of treatment and therapeutic uses, is also be read as a reference to each and all of these sub-formulae.

In an embodiment, the present invention also provides a method of treating T2DM in a patient in need of such treatment, comprising administering to the patient an effective amount of a compound of Formula I, or a pharmaceutically acceptable salt thereof.

In an embodiment, the present invention also provides a method of treating heart failure in a patient in need of such treatment, comprising administering to the patient an effective amount of a compound of Formula I, or a pharmaceutically acceptable salt thereof.

In an embodiment, the present invention also provides a method of treating diabetic kidney disease in a patient in need of such treatment, comprising administering to the patient an effective amount of a compound of Formula I, or a pharmaceutically acceptable salt thereof.

In an embodiment, the present invention also provides a method of treating NASH in a patient in need of such treatment, comprising administering to the patient an effective amount of a compound of Formula I, or a pharmaceutically acceptable salt thereof.

In an embodiment, the present invention further provides a method of treating a disease selected from the group consisting of metabolic syndrome, NAFLD, obesity, diabetic complications for example diabetic retinopathy, cardiovascular disease, coronary artery disease, chronic kidney disease and dyslipidemia, in a patient in need of such treatment, comprising administering to the patient an effective amount of a compound of Formula I, or a pharmaceutically acceptable salt thereof.

Furthermore, in an embodiment, this invention provides a compound of Formula I, or a pharmaceutically acceptable salt thereof, for use in therapy. In an embodiment, the present invention provides a compound of Formula I, or a pharmaceutically acceptable salt thereof, for use in treating T2DM. In an embodiment, the present invention provides a compound of Formula I, or a pharmaceutically acceptable salt thereof, for use in treating heart failure. In an embodiment, the present invention provides a compound of Formula I, or a pharmaceutically acceptable salt thereof, for use in treating diabetic kidney disease. In an embodiment, the present invention provides a compound of Formula I, or a pharmaceutically acceptable salt thereof, for use in treating NASH. In an embodiment, the invention also provides a compound of Formula I, or a pharmaceutically acceptable salt thereof, for use in treating metabolic syndrome, NAFLD, obesity, diabetic complications for example diabetic retinopathy, cardiovascular disease, coronary artery disease, chronic kidney disease or dyslipidemia.

Furthermore, in an embodiment, this invention provides the use of a compound of Formula I, or a pharmaceutically acceptable salt thereof, for the manufacture of a medicament for treating T2DM. In an embodiment, the present invention provides the use of a compound of Formula I, or a pharmaceutically acceptable salt thereof, for the manufacture of a medicament for treating heart failure. In an embodiment, the present invention provides the use of a compound of Formula I, or a pharmaceutically acceptable salt thereof, for the manufacture of a medicament for treating diabetic kidney disease. In an embodiment, the present invention provides the use of a compound of Formula I, or a pharmaceutically acceptable salt thereof, for the manufacture of a medicament for treating NASH. In an embodiment, the invention also provides the use of a compound of Formula I, or a pharmaceutically acceptable salt thereof, for the manufacture of a medicament for treating metabolic syndrome, NAFLD, obesity, diabetic complications for example diabetic retinopathy, cardiovascular disease, coronary artery disease, chronic kidney disease or dyslipidemia.

In an embodiment, the invention further provides a pharmaceutical composition, comprising a compound of Formula I, or a pharmaceutically acceptable salt thereof, with one or more pharmaceutically acceptable carriers, diluents, or excipients. In an embodiment, the invention further provides a process for preparing a pharmaceutical composition, comprising admixing a compound of Formula I, or a pharmaceutically acceptable salt thereof, with one or more pharmaceutically acceptable carriers, diluents, or excipients.

As used herein, the terms "treating" or "to treat" includes restraining, slowing, stopping, or reversing the progression or severity of an existing symptom or disorder.

As used herein, the term "patient" refers to a mammal. Preferably, the patient is human.

As used herein, the term "effective amount" refers to the amount or dose of compound of the invention, or a pharmaceutically acceptable salt thereof which, upon single or multiple dose administration to the patient, provides the desired effect in the patient under diagnosis or treatment.

An effective amount can be determined by one skilled in the art by the use of known techniques and by observing results obtained under analogous circumstances. In determining the effective amount for a patient, a number of factors are considered, including, but not limited to: the species of patient; its size, age, and general health; the specific disease or disorder involved; the degree of or involvement or the severity of the disease or disorder; the response of the individual patient; the particular compound administered; the mode of administration; the bioavailability characteristics of the preparation administered; the dose regimen selected; the use of concomitant medication; and other relevant circumstances. The compounds of the present invention are effective at a dosage per day that falls within the range of about 0.1 to about 15 mg/kg of body weight.

The compounds of the present invention are formulated as pharmaceutical compositions administered by any route which makes the compound bioavailable. Preferably, such compositions are for oral administration. Such pharmaceutical compositions and processes for preparing same are well known in the art (See, e.g., Remington, J. P., "*Remington: The Science and Practice of Pharmacy*", L. V. Allen, Editor, 22$^{nd}$ Edition, Pharmaceutical Press, 2012).

The compounds of Formula I and the pharmaceutically acceptable salts thereof may be used in the methods of treatment and therapeutic uses of the invention, with certain configurations being preferred. It will be understood that the following preferences are applicable both to the treatment methods, the therapeutic uses and to the compounds of the invention.

Compounds of the Formula I include:

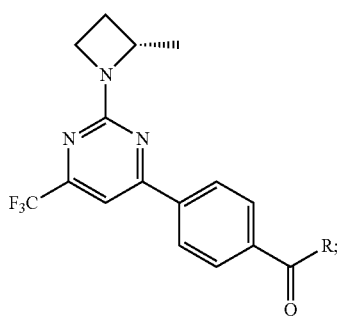

Formula Ia

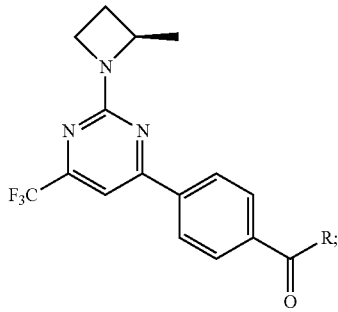

Formula Ib and pharmaceutically acceptable salts thereof.

Although the present invention contemplates all individual enantiomers and diasteromers, as well as mixtures of said compounds, including racemates, compounds of Formula Ia, and pharmaceutically acceptable salts thereof, are particularly preferred.

Individual enantiomers may be separated or resolved by one of ordinary skill in the art at any convenient point in the synthesis of compounds of Formula I, by methods such as selective crystallization techniques, chiral chromatography (See for example, J. Jacques, et al., "*Enantiomers, Racemates, and Resolutions*", John Wiley and Sons, Inc., 1981, and E. L. Eliel and S. H. Wilen, "*Stereochemistry of Organic Compounds*", Wiley-Interscience, 1994), or supercritical fluid chromatography (SFC) (See for example, T. A. Berger; "*Supercritical Fluid Chromatography Primer*," Agilent Technologies, July 2015).

A pharmaceutically acceptable salt of the compounds of Formula I can be formed, for example, by reaction of an appropriate free base of a compound of Formula I and an appropriate pharmaceutically acceptable acid in a suitable solvent under standard conditions well known in the art (See, for example, Bastin, R. J., et al.; *Org. Process. Res. Dev.*, 4, 427-435, 2000 and Berge, S. M., et al.; *J. Pharm. Sci.*, 66, 1-19, 1977).

The compounds of Formula I, or salts thereof, may be prepared by a variety of procedures known to one of ordinary skill in the art, some of which are illustrated in the schemes, preparations, and examples below. The products of each step in the schemes below can be recovered by conventional methods well known in the art, including extraction, evaporation, precipitation, chromatography, filtration, trituration, and crystallization. In the schemes below, all substituents unless otherwise indicated, are as previously defined. The reagents and starting materials are readily available to one of ordinary skill in the art. Without limiting the scope of the invention, the following schemes, preparations, and examples are provided to further illustrate the invention. In addition, one of ordinary skill in the art appreciates that compounds of Formula I may be prepared by using starting material or intermediate with the corresponding desired stereochemical configuration which can be prepared by one of skill in the art.

Certain abbreviations are defined as follows: "ACN" refers to acetonitrile; "CDMT" refers to 2-chloro-4,6-dimethoxy-1,3,5-triazine; "DCM" refers to methylene chloride or dichloromethane; "DIPEA" refers to diisopropylethylamine; "DMEM" refers to Dulbecco's Modified Eagle's medium; "DMF" refers to N,N-dimethylformamide; "DMSO" refers to dimethyl sulfoxide; "ELSD" refers to Evaporative light scattering detector; "ES/MS" refers to Electrospray Mass Spectrometry; "EtOAc" refers to ethyl acetate; "EtOH"

refers to ethanol or ethyl alcohol; "FBS" refers to fetal bovine serum; "h" refers to hour or hours; "HATU" refers to 1-[bis(dimethylamino)methylene]-1H-1,2,3-triazolo[4,5-b]pyridinium 3-oxide hexafluorophosphate; "HPLC" refers to high-performance liquid chromatography; "Me" refers to methyl; "MeOH" refers to methanol; "MTBE" refers to methyl-tert-butyl ether; "min" refers to minute or minutes; "m/z" refers to mass-to-charge ratio; "Ph" refers to phenyl; "RBF" refers to round bottom flask; "RT" refers to room temperature; "SCX" refers to selective cation exchange; "se" refers to standard error; "SFC" refers to Supercritical Fluid Chromatography; "TBTU" refers to 2-(1H-benzotriazole-1-yl)-1,1,3,3-tetramethyluronium tetrafluoroborate; "TFA" refers to trifluoroacetic acid; "THF" refers to tetrahydrofuran.

Scheme 1

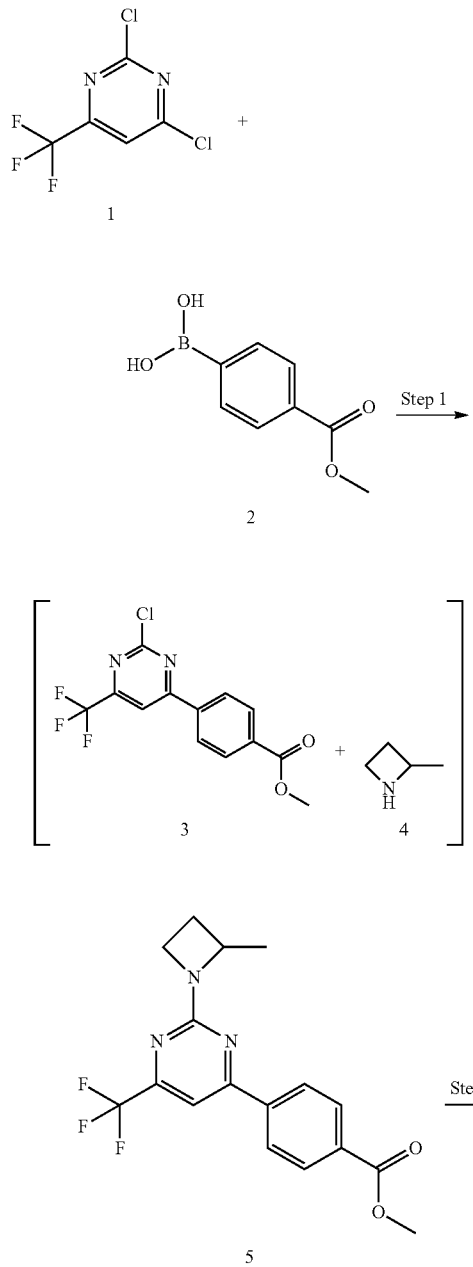

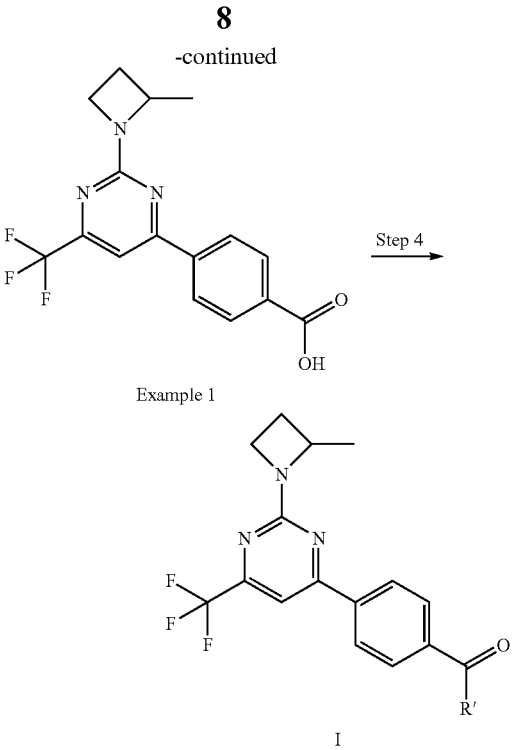

Scheme 1 depicts the general preparation of the compounds of Formula I. Steps 1 and 2 are completed in one pot. 2,4-Dichloro-6-(trifluoromethyl)pyrimidine (1) first undergoes a room temperature Suzuki coupling with a palladium catalyst, aqueous base such as sodium carbonate, and (4-methoxycarbonylphenyl)boronic acid (2) to give the chloropyrimidine intermediate (3). To the reaction mixture from Step 1 is added 2-methylazetidine (4) or a salt thereof and then the reaction is heated to give the ester intermediate (5) (Step 2). In Step 3, ester intermediate (5) is hydrolyzed with sodium hydroxide at elevated temperature to give the acid compound of Example 1. Finally, alternate compounds of Formula I are prepared by coupling the acid compound of Example 1 with the appropriate amine in Step 4. Step 4 can be achieved using HATU in DMF, EtOAc/DMF, or ACN; TBTU in ACN; or CDMT in THF.

PREPARATIONS AND EXAMPLES

The following Preparations and Examples further illustrate the invention and represent typical synthesis of the compound of the invention. The reagents and starting materials are readily available or may be readily synthesized by one of ordinary skill in the art. It should be understood that the Preparations and Examples are set forth by way of illustration and not limitation, and that various modifications may be made by one of ordinary skill in the art.

LC-ES/MS is performed on an AGILENT® HP1100 liquid chromatography system. Electrospray mass spectrometry measurements (acquired in positive and/or negative mode) are performed on a Mass Selective Detector quadrupole mass spectrometer interfaced to an HPLC which may or may not have an ELSD. LC-MS conditions (low pH): column: PHENOMENEX® GEMINI® NX C18 2.0×50 mm 3.0 μm, 110 Å; gradient: 5-95% B in 1.5 min, then 95% B for 0.5 min column temperature: 50° C.+/−10° C.; flow rate: 1.2 mL/min; 1 μL injection volume; Solvent A: deionized water with 0.1% HCOOH; Solvent B: ACN with 0.1% formic acid; wavelength 200-400 nm and 212-216 nm. If the HPLC is equipped with an ELSD the settings are 45° C. evaporator temperature, 40° C. nebulizer temperature, and 1.6 SLM gas flow rate. Alternate LC-MS conditions (high pH): column: Waters)(Bridge® C18 column 2.1×50 mm, 3.5 µm; gradient: 5-95% B in 1.5 min, then 95% B for 0.50 min; column temperature: 50° C.+/−10° C.; flow rate: 1.2 mL/min; injection volume; 14, injection volume; Solvent A: 10 mM NH$_4$HCO$_3$ pH 9; Solvent B: ACN; wavelength: 200-400 nm and 212-216 nm; if had ELSD: 45° C. evaporator temp, 40° C. nebulizer temp, and 1.60 SLM gas flow rate.

Preparation 1

(2S)-1-Benzhydryl-2-methyl-azetidine[(1R,4S)-7,7-dimethyl-2-oxo-norbornan-1-yl]methanesulfonic acid salt

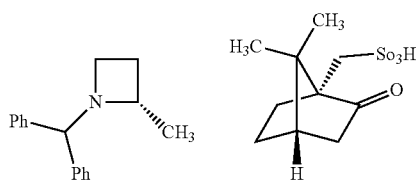

Assemble a 2000 mL 3-neck RBF with an addition funnel, nitrogen inlet and a thermometer adapter. Purge the vessel with nitrogen and add (3R)-butane-1,3-diol (25 g, 277.4 mmol), DIPEA (127 ml, 731 mmol) and ACN (556 ml). Cool to −30° C. Add trifluoromethanesulfonic anhydride (101 mL, 601 mmol) dropwise over 3 h such that the internal temperature is maintained between −35 and −30° C. After the completion of the addition, stir for 10 min at −35 to −30° C. Add trifluoromethanesulfonic anhydride (1.9 mL, 11 mmol) dropwise over 5 min such that the internal temperature is maintained between −35 and −30° C. After the completion of the addition, stir for 10 min at −35 to −30° C. Add DIPEA (127 mL, 731 mmol) dropwise over 15 min such that the internal temperature is maintained between −35 and −30° C. After the completion of the addition, stir for 10 min at −35 to −30° C. In a separate flask under nitrogen, dissolve aminodiphenylmethane (48.0 mL, 270 mmol) in ACN (49 mL, 935 mmol) and transfer the resulting solution to the addition funnel. Add the amine solution to the cold triflate dropwise over 40 min such that the internal temperature is maintained between −20 to −35° C. After the completion of the addition, stir for 30 min at −35 to −30° C. Transfer the reaction to a water bath and allow it to slowly warm over 30 min. Remove the bath and allow the reaction to warm to RT over 30 min. Transfer the vessel to a heating mantle and warm the reaction to 45° C. for 30 min, then cool to RT. Pour the resulting mixture into 1200 mL of water and extract with toluene (400 mL×3). Combine the extracts, wash with water, sat. aq. NaCl solution, dry over anhydrous Na$_2$SO$_4$, filter and concentrate on a rotary evaporator. Dry the material under vacuum overnight. Dissolve the residue in DCM (400 mL). Prepare a silica pad on a fitted funnel and equilibrate it with 1:1 heptane/EtOAc. Load the product solution onto the silica pad and wash with 1600 mL of 1:1 heptane/EtOAc. Concentrate the filtrate to give a red oil. Dissolve the oil in MeOH (250 mL) and place the flask in a water bath (~10° C.). Add L(−)-camphorsulfonic acid (61.6 g, 265 mmol) portion-wise keeping the internal temperature below 20° C. Stir the resulting mixture for 15 min and then concentrate on a rotary evaporator to give a brown foam. Dry the foam on a vacuum pump for 2 h. Dissolve the foam in 130 mL of DCM. Attach an addition funnel to the flask. Use the funnel to slowly add 1100 mL of EtOAc to the stirring solution. Transfer the resulting mixture to a 4000 mL beaker and stir open to the atmosphere overnight. Cool the beaker in an ice bath for 10 min. Collect the precipitate in a fritted funnel by vacuum filtration washing with a minimal amount of ice-cold EtOAc. Dry the solid on the frit for 2 h. Dissolve the resulting white solid in a minimal amount of DCM, transfer to a 2000 mL beaker and then dilute slowly with EtOAc until the clear solution starts to become cloudy. Stir the suspension for 4 h while open to the atmosphere. Collect the solids by vacuum filtration using a fritted funnel and dry on the frit overnight to give the title compound (111.8 g, 238.06 mmol, 86% Yield) as a white solid. $^1$H NMR (400 MHz, d6-DMSO): 10.54-10.47 (m, 1H), 7.61 (d, J=7.3 Hz, 5H), 7.47-7.37 (m, 7H), 5.85 (d, J=10.3 Hz, 1H), 4.68-4.61 (m, 1H), 3.91-3.83 (m, 2H), 3.37 (s, 8H), 2.99 (d, J=14.6 Hz, 1H), 2.77-2.68 (m, 1H), 2.51-2.44 (m, 4H), 2.30-2.16 (m, 2H), 1.91-1.81 (m, 2H), 1.42-1.28 (m, 3H), 1.08 (s, 3H), 1.01 (d, J=6.6 Hz, 3H), 0.77 (s, 4H); >98% ee[HPLC: Chiralcel OJ (10 cm×4.6 mm, 5 µm), 5 mL/min, 40° C. isocratic 10% EtOH (0.2% $^i$PrNH$_2$)/CO$_2$].

Preparation 2

[(1R,4S)-7,7-Dimethyl-2-oxo-norbornan-1-yl]methanesulfonate (2S)-2-methylazetidin-1-ium salt

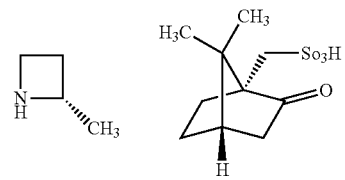

To a 2250 mL Parr vessel add 20 wt % Pd(OH)$_2$ on carbon (6.62 g). Purge the bottle with nitrogen and add 250 mL of MeOH. To the resulting suspension, slowly add (2S)-1-benzhydryl-2-methyl-azetidine [(1R,4S)-7,7-dimethyl-2-oxo-norbornan-1-yl]methanesulfonic acid salt (111 g, 236 mmol) dissolved in 250 mL of MeOH. Seal the vessel. Purge with nitrogen followed by hydrogen and pressurize to 60 PSI. Vigorously shake the reaction vessel in a Parr Shaker apparatus for 15 h at RT. Purge the vessel with nitrogen and then filter the reaction mixture through a pad of Celite®, washing with MeOH. Concentrate the filtrate to give a white solid and dry under vacuum. Suspend the solid in 780 mL of 1:1 MTBE/EtOAc and heat the mixture to 65° C. for 20 h then cool to RT and stir overnight. Collect the solids by filtration. Suspend the solids in 380 mL of MTBE and stir at RT for 24 h. Collect the white solid by filtration to give the title compound (41.5 g, 136.78 mmol, 58% Yield). $^1$H NMR (400 MHz, d6-DMSO): 8.68-8.55 (m, 1H), 4.51-4.42 (m, 1H), 3.91-3.75 (m, 1H), 3.36 (s, 3H), 2.91 (d, J=14.6 Hz, 1H), 2.69-2.61 (m, 1H), 2.52-2.46 (m, 2H), 2.28-2.22 (m, 1H), 2.17-2.10 (m, 1H), 1.96 (t, J=4.5 Hz, 1H), 1.89-1.79 (m, 1H), 1.43 (d, J=6.7 Hz, 2H), 1.36-1.26 (m, 1H), 1.05 (s, 2H), 0.75 (s, 2H).

Preparation 3

Methyl 4-{2-[(2S)-2-methylazetidin-1-yl]-6-(trifluoromethyl)pyrimidin-4-yl}benzoate

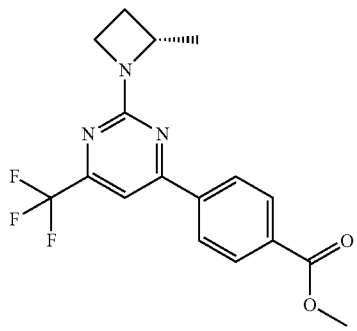 [SMILES: COC(=O)c1ccc(-c2cc(C(F)(F)F)nc(N3CC[C@@H]3C)n2)cc1]

In a 2 L 3-neck RBF under nitrogen, combine 2,4-dichloro-6-(trifluoromethyl)pyrimidine (25.00 g, 112.9 mmol), (4-methoxycarbonylphenyl)boronic acid (21.34 g, 118.6 mmol), aqueous sodium carbonate (2 M, 170 mL, 340 mmol) and 1,4-dioxane (500 mL). Stir at RT and bubble nitrogen into the mixture for 10 min. Add bis(triphenylphosphine)palladium (II) dichloride (1.585 g, 2.258 mmol) portion-wise. Stir the mixture at RT for 23 h. To the suspension, add [(1R,4S)-7,7-Dimethyl-2-oxo-norbornan-1-yl]methanesulfonate (2S)-2-methylazetidin-1-ium salt (35.97 g, 118.6 mmol). Heat the suspension to 75° C. for 1 h. Remove the heat source and add water (500 mL) via addition funnel over 10 min. Allow the mixture to cool to RT and isolate the yellow solid by filtration. Dry the material in a vacuum oven at 45° C. to give the title compound as a yellow solid (41.75 g, quantitative yield). $^1$H NMR (400 MHz, DMSO-d6) δ 8.35-8.32 (m, 2H), 8.11-8.08 (m, 2H), 7.66 (s, 1H), 4.64-4.57 (m, 1H), 4.16-4.06 (m, 2H), 3.90 (s, 3H), 2.52-2.45 (m, 1H), 2.06-2.00 (m, 1H), 1.54 (d, J=4.2 Hz, 3H); ES/MS m/z 352 (M+H).

Example 1

4-{2-[(2S)-2-Methylazetidin-1-yl]-6-(trifluoromethyl)pyrimidin-4-yl}benzoic acid

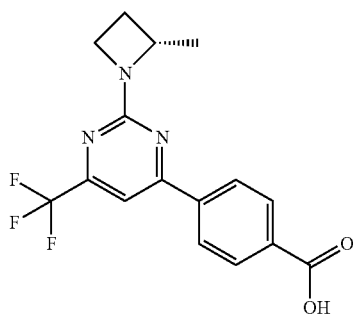 [SMILES: C[C@H]1CCN1c1nc(-c2ccc(C(=O)O)cc2)cc(C(F)(F)F)n1]

In a 2 L RBF under nitrogen, carefully combine methyl 4-{2-[(2S)-2-methylazetidin-1-yl]-6-(trifluoromethyl)pyrimidin-4-yl}benzoate (41.80 g, 115.4 mmol), aqueous sodium hydroxide (2 M, 173.1 mL, 346 mmol), MeOH (418 mL) and THF (209 mL). Slowly warm the resulting mixture to 75° C. and stir for 2 h, then cool to RT. Remove the organic solvents in-vacuo. Add water (400 mL) and EtOAc (300 mL). Filter the resulting mixture through a pad of Celite® using vacuum filtration. Separate the organic layer. Wash the basic aqueous layer with more EtOAc (300 mL). Acidify the aqueous layer to pH=5 using 2 M HCl. Extract with EtOAc (3×300 mL). Combine the organic extracts, dry over sodium sulfate, filter, and concentrate. Dry the residue under vacuum and then dissolve it in THF (750 mL) and add SiliaMetS® Thiol (Si-Thiol) resin (2.5 g). Stir the resulting mixture at 40° C. for 6 h then cool to RT and filter. Concentrate the filtrate to give a solid. Combine this with material prepared using essentially the same procedure as described above starting with methyl 4-{2-[(2S)-2-methylazetidin-1-yl]-6-(trifluoromethyl)pyrimidin-4-yl}benzoate (7.95 g, 21.5 mmol). Stir the combined material in a 10:1 (v/v) solution of heptane: EtOAc for 1 h. Collect the solid by filtration, wash with heptane, and dry under vacuum to give the title compound (34.8 g, 75%). ES/MS m/z 338 (M+H), 336 (M−H).

Example 2

[(3R,4S)-3,4-Dihydroxypyrrolidin-1-yl]-[4-{2-[(2S)-2-methylazetidin-1-yl]-6-(trifluoromethyl)pyrimidin-4-yl}phenyl]methanone

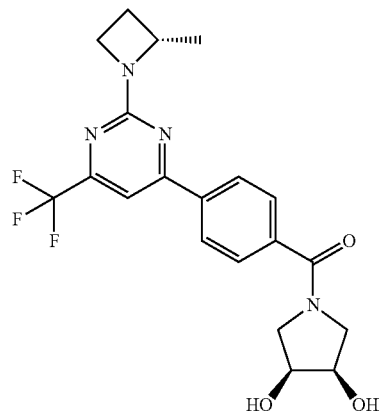 [SMILES: C[C@H]1CCN1c1nc(-c2ccc(C(=O)N3C[C@@H](O)[C@@H](O)C3)cc2)cc(C(F)(F)F)n1]

Step 1—Coupling
Coupling Method A:

Charge a RBF under a nitrogen atmosphere with 4-{2-[(2S)-2-methylazetidin-1-yl]-6-(trifluoromethyl)pyrimidin-4-yl}benzoic acid (10 g, 29.1 mmol), (3R,4S)-pyrrolidine-3,4-diol hydrochloride (4.39 g, 30.5 mmol) and DMF (39.2 mL). Add DIPEA (12.1 mL, 69.7 mmol) slowly. Cool the resulting mixture down to 3° C. and add HATU (16.6 g, 43.6 mmol) over 5 min while stirring. Stir for 90 min. Partition the resulting reaction between aqueous dibasic potassium phosphate (2 M, 100 mL) and EtOAc (100 mL). Separate the organic phase. Extract the aqueous phase with EtOAc (100 mL). Combine the organic phases and wash with aqueous lithium chloride (10 mass %, 200 mL×3), and concentrate to give the crude title compound (21.4 g) as a yellow foam.
Coupling Method B:

Perform the coupling procedure essentially as described in Coupling Method A with the following exceptions: starting with 4-{2-[(2S-2-methylazetidin-1-yl]-6-(trifluoromethyl)pyrimidin-4-yl}benzoic acid (2.10 g, 6.10 mmol), omit the use of EtOAc as reaction solvent and use DMF alone (21 mL), and work up the reaction by partitioning between aqueous lithium chloride (10 mass %, 42 mL) and EtOAc (21 mL) instead of aqueous dibasic potassium phosphate (2 M) and EtOAc. Obtain the crude title compound (2.67 g) as a yellow foam.

Coupling Method C:

To a 4° C. stirring mixture of 4-{2-[(2S)-2-methylazetidin-1-yl]-6-(trifluoromethyl)pyrimidin-4-yl}benzoic acid (1.03 g, 2.99 mmol) and CDMT (0.696 g, 3.88 mmol) in THF (18 mL) under nitrogen, add 4-methylmorpholine (0.453 g, 0.494 mL, 4.48 mmol) dropwise. Stir the mixture for 30 min at RT and add dropwise a suspension of (3R,4S)-pyrrolidine-3,4-diol hydrochloride (0.451 g, 3.14 mmol), THF (6 mL), triethylamine (0.907 g, 1.25 mL, 8.96 mmol) and 4-methylmorpholine (0.453 g, 0.494 mL, 4.48 mmol) which was previously prepared by stirring at RT. Stir the resulting mixture at 4° C. After 1 h, add more (3R,4S)-pyrrolidine-3,4-diol hydrochloride (0.043 g, 0.299 mmol) and warm the mixture to RT. After 2 h, filter the reaction mixture under reduced pressure using a sintered funnel (3 Å pore size). Remove volatiles in-vacuo and dry the residue under a stream of air for 30 min and under high vacuum overnight. Partition the residue between saturated aqueous NaHCO$_3$ (20 mL) and EtOAc (20 mL). Wash the organic phase again with saturated aqueous NaHCO$_3$ (20 mL), allowing the phases to resolve overnight. Dry the organic layer with MgSO$_4$, filter and remove all volatiles under reduced pressure to give the crude title compound (1.44 g) as a yellow transparent oil.

Coupling Method D:

Charge a RBF under nitrogen with 4-{2-[(2S)-2-methylazetidin-1-yl]-6-(trifluoromethyl)pyrimidin-4-yl}benzoic acid (1.99 g, 5.79 mmol), (3R,4S)-pyrrolidine-3,4-diol hydrochloride (0.875 g, 6.08 mmol) and ACN (16 mL), then add DIPEA (2.25 g, 3.01 mL, 17.4 mmol) gently. Stir the mixture at RT for 5 min, then add HATU (2.64 g, 6.95 mmol). After stirring for 25 min, remove all volatiles under reduced pressure. Dilute the residue with isopropyl acetate (20 mL) and extract with aqueous HCl (1 M, 20 mL×2), water (20 mL), aqueous sodium carbonate (1 M, 20 mL), and water (20 mL). Dry the organic layer with MgSO$_4$, filter and remove all volatiles under reduced pressure. Dissolve this material in MeTHF (18 mL) and wash with aqueous NaOH (1 M, 18 mL). Dry the organic layer with MgSO$_4$, filter and remove all volatiles under reduced pressure to give the crude title compound (1.53 g) as a yellow foam.

Coupling Method E:

Charge a RBF under a nitrogen atmosphere with 4-{2-[(2S)-2-methylazetidin-1-yl]-6-(trifluoromethyl)pyrimidin-4-yl}benzoic acid (8.61 g, 25.0 mmol), (3R,4S)-pyrrolidine-3,4-diol hydrochloride (3.8 g, 26.2 mmol) and ACN (71 mL). Add DIPEA (13 mL, 75 mmol) slowly. While stirring the resulting mixture, add TBTU (9.0 g, 27.5 mmol). Stir for 6 min. Remove all volatiles in-vacuo. Dissolve the residue in 2-methyltetrahydrofuran (86 mL) and wash with hydrochloric acid (1 M, 86 mL×2), sodium hydroxide (1 M, 86 mL×2) and lithium chloride (10 mass %, 86 mL). Dry the organic phase over MgSO$_4$, filter, and concentrate. Dissolve the residue in EtOAc (43 mL) and concentrate to dryness two times to give the crude title compound (10.3 g) as a yellow foam.

Prepare separate lots of the crude title compound using the starting material amounts and coupling methods as shown in Table 1. The starting material referred to in Table 1 is 4-{2-[(2S)-2-methylazetidin-1-yl]-6-(trifluoromethyl)pyrimidin-4-yl}benzoic acid.

TABLE 1

| Crude product lot number | Amount of starting material used (g) | Amount of starting material used (mmol) | Coupling method used |
|---|---|---|---|
| 1 | 0.202 | 0.570 | C |
| 2 | 0.104 | 0.300 | B |
| 3 | 2.10 | 6.10 | B |
| 4 | 1.02 | 2.95 | A |
| 5 | 1.03 | 2.99 | C |
| 6 | 10 | 29.1 | A |
| 7 | 2.02 | 5.88 | A |
| 8 | 1.99 | 5.79 | D |
| 9 | 0.104 | 0.302 | E |
| 10 | 2.00 | 5.80 | E |
| 11 | 2.04 | 5.92 | E |
| 12 | 1.03 | 2.99 | D |
| 13 | 1.03 | 2.99 | A |
| 14 | 1.05 | 3.06 | E |
| 15 | 8.61 | 25.0 | E |

Step 2—Purification

Purification Method A:

Combine Lots 1-6 and purify the combined crude product by silica gel chromatography using a gradient of 0 to 3% EtOH in EtOAc to give a yellow foam. Dissolve this material in EtOAc (300 mL) and wash with lithium chloride (10 mass %) in water (372 mL) three times. Dry the organic phase over MgSO$_4$, filter and concentrate in-vacuo to give a yellow solid. Triturate the solid in heptane (177 mL) for 2 h, filter, air dry, and then dry under vacuum overnight to give the title compound (14.65 g, 82% overall yield from coupling and purification steps) as a yellow solid.

Purification Method B:

Combine Lots 7-15 and purify the combined crude product by silica gel chromatography using a gradient of 0 to 10% EtOH in EtOAc to give a yellow foam. Triturate this material in a 5% acetone/heptane mixture (165 mL) at 60° C. for 30 min and then at RT for 6 h. Filter under reduced pressure, dry under a stream of air for 30 min and then under high vacuum to give the title compound (15.8 g, 64% overall yield from coupling and purification steps) as a crystalline white powder.

Example 3

N-[2-Hydroxy-1,1-bis(hydroxymethyl)ethyl]-4-{2-[(2S)-2-methylazetidin-1-yl]-6-(trifluoromethyl) pyrimidin-4-yl}benzamide

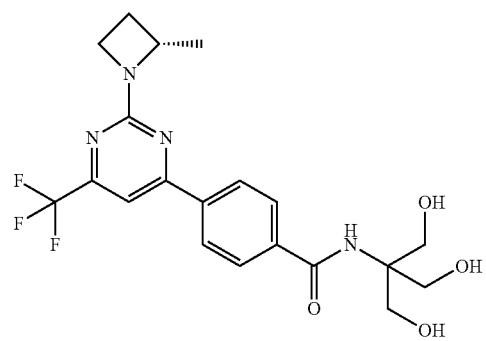 [SMILES: C[C@H]1CCN1c1nc(-c2ccc(C(=O)NC(CO)(CO)CO)cc2)cc(C(F)(F)F)n1]

Dissolve 4 {2-[(2S)-2-methylazetidin-1-yl]-6-(trifluoromethyl)pyrimidin-4-yl}benzoic acid (700 mg, 2.08 mmol) in DMF (10 mL) in a vial. Add 2-amino-2-(hydroxymethyl)

propane-1,3-diol (280 mg, 2.31 mmol), HATU (1.21 g, 1.21 g) and DIPEA (1.1 mL, 6.3 mmol). Seal the vial and stir at RT for 1 h. Dilute the mixture with EtOAc, wash twice with water, and then wash with saturated aqueous NaCl. Dry the organic layer over $Na_2SO_4$, filter and concentrate. Purify the resulting material by silica gel chromatography using a gradient of 0 to 10% MeOH in $CH_2Cl_2$, followed by reverse-phase chromatography using a gradient of 10 to 100% ACN (containing 0.1% TFA) in water (containing 0.1% TFA) to give the title compound (287 mg, 31%). ES/MS m/z 441 (M+H), 439 (M−H).

Assays

KHK Enzyme Activity Assay for Human KHK-C and Human KHK-A

The intrinsic potency for inhitibiton of KHK C or A activity may be measured using an enzymatic assay which measures the production of F1P. Compounds are prepared in DMSO and tested in a 10-point concentration curve, to create 3-fold serial dilutions of the compounds in a 96-well plate ranging from 20 μM to 1.02 nM. Enzyme is prepared in assay buffer [50 mM 4-(2-hydroxyethyl)piperazine-1-ethanesulfonic acid (HEPES), 10 mM potassium chloride, 100 mM magnesium chloride, 2 mM tris(2-carboxyethyl)phosphine (TCEP), 0.01% n-octyl glucoside] and incubated with compounds at RT for 15 min. The reaction is carried out in 100 μL volumes containing substrate concentrations of fructose (250 μM for KHK-C assay and 1.25 mM for KHK-A assay) and ATP (150 μM for both isoforms); which are further incubated at RT for 20 min. The reaction is then halted by the addition of stop buffer; consisting of 0.2% formic acid and 1 μg/ml $^{13}C_6$-fructose-6-phosphate ($^{13}C_6$-F6P) internal standard. Plates are stored in −20° C. until RapidFire MS analysis.

RapidFire MS Analysis for Quantitation of F1P

An Agilent 300 RapidFire automated extraction system (Agilent, Santa Clara, CA) with three HPLC quaternary pumps is coupled to an Agilent 6495 triple quadrupole mass spectrometer (Agilent Technologies, Santa Clara, CA) equipped with an electrospray ionization (ESI) interface source. The RapidFire Mass Spec system is equipped with a reusable RapidFire C18 (type C) solid-phase extraction (SPE) cartridge (G9205A).

Solvent A, used for sample loading and washing, is 6 mM octylamine (Acros Organics 129495000) brought to pH 5.0 using acetic acid. Solvent B, used for sample elution, is 20% water in ACN containing 0.1% formic acid. Samples are sequentially analyzed by aspirating 10 μL onto the collection loop under vacuum directly from multiwell plates. The 10 μL of sample is loaded onto the C18 cartridge and washed using solvent A at a flow rate of 1.25 mL/min for 5000 ms. The retained analytes are then eluted to the mass spectrometer using solvent B at a flow rate of 1.25 mL/min for 5000 ms. The system is re-equilibrated using solvent A at a flow rate of 1.25 mL/min for 2000 ms.

The triple quadrupole mass spectrometer is equipped with an ESI source and analytes are monitored using selected reaction monitoring (SRM) in negative mode [M−H]−. F1P is monitored at m/z 259.02/96.9 and $^{13}C_6$-fructose-6-phospate is monitored at m/z 264.99/97. The area ratio values for F1P is calculated using $^{13}C_6$-fructose-6-phospate as internal standard.

The compounds of Examples 1 to 3 were tested essentially as described above:

TABLE 2

| Example Number | hKHK-C $IC_{50}$ (nM) | hKHK-A $IC_{50}$ (nM) |
| --- | --- | --- |
| 1 | 22.6 (se = 13.8, n = 4) | 21.5 (se = 16.3, n = 4) |
| 2 | 23.1 (se = 16.8, n = 3) | 12.7 (se = 9.68, n = 3) |
| 3 | 29.7 (se = 7.53, n = 4) | 23.4 (se = 2.29, n = 5) |

The results as shown in Table 2 above demonstrate that the compounds of Examples 1 to 3 inhibit the enzymatic activity of both KHK-C and KHK-A.

KHK Cellular Activity Assay

Potency can be measured using a cellular assay for the inhibition of conversion of Fructose to F1P by cellular KHK. HepG2 liver cells are plated on 96-well cell culture plates in growth media [Dulbecco's Modified Eagle's medium (DMEM) high glucose, 10% heat-inactivated fetal bovine serum (HI FBS), 1×Penicillin/streptomycin] and allowed to attach overnight in a 37° C. incubator. The growth media is washed and replaced with assay media consisting of Gibco OptiMEM1 Reduced Serum Medium, 0.1% Casein, 8.33 mM D-Fructose-$^{13}C_6$, and compound concentrations ranging from 100 μM to 0.0051 μM (10-point concentration curve). Plates are incubated at 37° C. for 3 h, after which assay media is aspirated from the cell wells. Stop solution consisting of 80% MeOH, 2 mM ammonium acetate, and 50 ng/mL fructose-6-phosphate-$^{13}C_6$ is then added to the cells. Plates are stored in −20° C. until RapidFire MS analysis (described above).

The compounds of Examples 1 to 3 were tested essentially as described above:

TABLE 3

| Example Number | HepG2 $IC_{50}$ (nM) |
| --- | --- |
| 1 | 911 (se = 150, n = 3) |
| 2 | 186 (se = 14.8, n = 3) |
| 3 | 82.1 (se = 6.24, n = 5) |

The results as shown in Table 3 above demonstrate that the compounds of Examples 1 to 3 inhibit the metabolism of fructose to F1P in HepG2 cells.

Liquid Chromatograph with Tandem Mass Spectrometry (LC-MS/MS) Method for Pharmacokinetic Assays: Samples are extracted using a protein precipitation by adding 180 μL of MeOH:ACN (1:1, v/v) containing an internal standard to 50 μL of plasma. Samples are then diluted with MeOH:Water (1:1, v/v) to get concentrations within standard curve range. Diluted samples are analyzed by LC-MS/MS using a Sciex API 4000 triple quadrupole mass spectrometer (Applied Biosystems/MDS; Foster City, CA) equipped with a TurboIonSpray interface, and operated in positive ion mode. The analytes are chromatographically separated using a ECHELON C18 4 um 20×2.1 mm column. LC conditions are Water/1 M ammonium bicarbonate, (2000:10, v/v) (Mobile Phase A), and MeOH/1 M ammonium bicarbonate, (2000:10, v/v) (Mobile Phase B).

Pharmacokinetics in Sprague Dawley Rats

The in vivo pharmacokinetic properties of Example 2 and Example 3 are demonstrated using Sprague Dawley Rats (fasted; n=3/dose route). The compound is administered by a single oral (PO; 3 mg/kg; volume of 10 mL/kg) or intravenous (IV; 1 mg/kg; volume of 1 mL/kg) dose in vehicle. Blood is collected from each animal at multiple time points between 0 and up to 24 hours post-dosage. The plasma concentrations of Example 2 and Example 3 are determined by a LC-MS/MS method as described above.

For Example 2, the bioavailability is 65%, while IV dosing revealed mean half-life is 6.42 hours and the mean clearance is 5.57 mL/min/kg. For Example 3, the bioavailability is 69%, while IV dosing revealed mean half-life is 2.95 hours and the mean clearance is 12.7 mL/min/kg. This data shows Examples 2 and 3 have low total clearance in the rat, suggesting minimal first pass extraction, high oral bioavailability, and prolonged elimination evidenced by adequate mean half-life.

Pharmacokinetics in Dogs

The in vivo pharmacokinetic properties of Example 2 and Example 3 are demonstrated using Beagle Dogs (fed, n=3). The compound is administered by a single oral (PO; 2 mg/kg; volume of 2 mL/kg) or intravenous (IV; 1 mg/kg; volume of 1 mL/kg) dose in vehicle. Blood is collected from each animal at multiple time points between 0 and up to 24 hours post-dosage. The plasma concentrations of Example 2 and Example 3 are determined by a LC-MS/MS method as described above.

For Example 2, IV dosing revealed mean half-life is 11.3 hours and the mean clearance is 2.15 mL/min/kg. For Example 3, the mean half-life is 4.52 hours and bioavailability is ~96% as determined by PO dosing, while IV dosing revealed mean half-life is 5.07 hours and the mean clearance is 4.77 mL/min/kg. This data shows Examples 2 and 3 have low total clearance in the rat, suggesting minimal first pass extraction, high oral bioavailability, and prolonged elimination evidenced by adequate mean half-life.

The invention claimed is:

1. A compound of the formula:

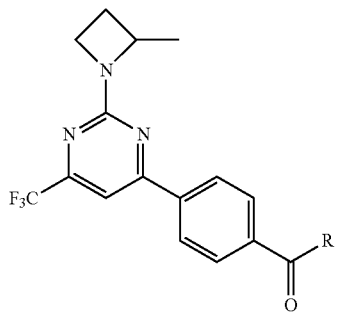

wherein
R is —OH, —NHC(CH$_2$OH)$_3$ or

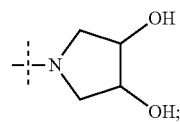

or a pharmaceutically acceptable salt thereof.

2. The compound according to claim 1 wherein the compound is:

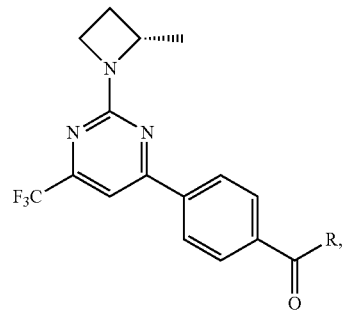

or a pharmaceutically acceptable salt thereof.

3. The compound according to claim 1 wherein the compound is:

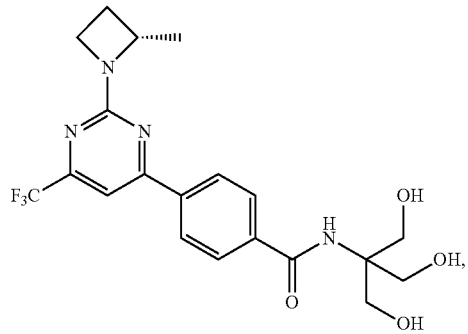 [SMILES: C[C@H]1CCN1c1nc(-c2ccc(C(=O)NC(CO)(CO)CO)cc2)cc(C(F)(F)F)n1]

or a pharmaceutically acceptable salt thereof.

4. A method of treating type 2 diabetes mellitus in a patient, comprising administering to a patient in need of such treatment an effective amount of a compound of claim 1, or a pharmaceutically acceptable salt thereof.

5. A method of treating heart failure in a patient, comprising administering to a patient in need of such treatment an effective amount of a compound of claim 1, or a pharmaceutically acceptable salt thereof.

6. A method of treating diabetic kidney disease in a patient, comprising administering to a patient in need of such treatment an effective amount of a compound of claim 1, or a pharmaceutically acceptable salt thereof.

7. A method of treating non-alcoholic steatohepatitis in a patient, comprising administering to a patient in need of such treatment an effective amount of a compound of claim 1, or a pharmaceutically acceptable salt thereof.

8. A pharmaceutical composition, comprising a compound, or a pharmaceutically acceptable salt thereof, according to claim 1 with one or more pharmaceutically acceptable carriers, diluents, or excipients.

9. A process for preparing a pharmaceutical composition, comprising admixing a compound, or a pharmaceutically acceptable salt thereof, according to claim 1 with one or more pharmaceutically acceptable carriers, diluents, or excipients.

* * * * *